United States Patent
Kurz et al.

(10) Patent No.: US 6,970,276 B2
(45) Date of Patent: Nov. 29, 2005

(54) APPARATUS AND METHOD FOR QUASI-PHASE-MATCHED NONLINEAR FREQUENCY MIXING BETWEEN DIFFERENT TRANSVERSE WIDTH MODES

(75) Inventors: Jonathan R. Kurz, Brooklyn, NY (US); Martin M. Fejer, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 193 days.

(21) Appl. No.: 10/444,934

(22) Filed: May 22, 2003

(65) Prior Publication Data

US 2004/0233511 A1 Nov. 25, 2004

(51) Int. Cl.[7] ............................. G02B 26/00; G02B 6/00
(52) U.S. Cl. ......................... 359/237; 385/122; 385/37
(58) Field of Search ................................ 359/237–239; 385/122, 37, 14, 130, 131, 27, 28

(56) References Cited

U.S. PATENT DOCUMENTS

| | | | |
|---|---|---|---|
| 4,763,019 A | | 8/1988 | Duguay et al. ............. 359/328 |
| 5,488,681 A | | 1/1996 | Deacon et al. ................ 385/37 |
| 5,526,450 A | * | 6/1996 | Kester et al. ................. 385/16 |
| 5,546,220 A | | 8/1996 | Endo et al. .................. 359/332 |
| 5,630,004 A | | 5/1997 | Deacon et al. .............. 385/129 |
| 5,872,884 A | | 2/1999 | Mizuuchi et al. ........... 385/130 |
| 5,991,490 A | | 11/1999 | Mizuuchi et al. ........... 385/130 |
| 6,393,172 B1 | | 5/2002 | Brinkman et al. ............ 385/16 |
| 6,760,492 B1 | * | 7/2004 | Lit et al. ....................... 385/5 |
| 2002/0191912 A1 | * | 12/2002 | Robinson et al. ............. 385/37 |

OTHER PUBLICATIONS

J.R. Kurz et al. "Optical-frequency Balanced Mixer", Optical Society of America, vol. 26, No. 16, Aug. 15, 2001, pp. 1283–1285.

H. Ito et al., "Efficient phase-matched second-harmonic generation method in four-layered optical-waveguide structure", Optical Society of America, vol. 2. No. 6, Jun. 1978, pp. 139–141.

M.L. Bortz et al., "Noncritcal Quasi-Phase-Matched Second Harmonic Generation in a Annealed Proton-Exchanged LiNbO3 Waveguide," IEEE Journal of Quantum Electronics, Dec. 30, 1994, pp. 2953–2960.

G. I. Stegman and C.T. Seaton, "Nonlinear Intergrated Optics", Journal of Applied Physics, Dec. 1985, vol. 58, pp. R57–R77.

* cited by examiner

*Primary Examiner*—Georgia Epps
*Assistant Examiner*—M. Hasan
(74) *Attorney, Agent, or Firm*—Lumen Intellectual Property Services, Inc.

(57) ABSTRACT

An apparatus and method for nonlinear frequency mixing of light waves relying on a nonlinear material having a nonlinear coefficient d and a waveguide fabricated in the nonlinear material. The waveguide is equipped with a quasi-phase-matching (QPM) grating extending along the length of the waveguide and endowed with an asymmetry of the nonlinear coefficient d along the width of the waveguide. The transverse asymmetry is chosen to establish a mode overlap for nonlinear frequency mixing between different transverse width modes of light. The transverse asymmetry can be odd or else neither odd nor even so as to establish mode overlap for frequency mixing between even transverse width modes and odd transverse width modes. The QPM grating can have single or multiple grating stripes that can be staggered, interleaved, angled and otherwise altered to achieve the transverse asymmetry establishing a mode overlap for frequency mixing between even transverse width modes and odd transverse width modes.

22 Claims, 6 Drawing Sheets

35 μm grating width    20 μm waveguide width

APPARATUS AND METHOD FOR QUASI-PHASE-MATCHED NONLINEAR FREQUENCY MIXING BETWEEN DIFFERENT TRANSVERSE WIDTH MODES

GOVERNMENT RIGHTS CLAUSE

This application was supported by DARPA through the Optoelectronics Materials Center, NSF under contract ECS-9903156 and AFORSR under contract 49620-99-1-0270. The government has certain rights in this invention.

FIELD OF THE INVENTION

The present invention relates generally to quasi-phase-matched (QPM) nonlinear frequency mixing between different transverse width modes of light, and more specifically to methods and QPM gratings for achieving nonlinear frequency mixing between odd and even modes.

BACKGROUND OF THE INVENTION

The field of nonlinear optics has benefited from advances in nonlinear optical materials. Nonlinear frequency mixing devices pass input light through such nonlinear materials to drive nonlinear interactions between waves and generate output light. The nonlinear mixing mechanisms generating the output light typically involve one or more of the following: harmonic and sub harmonic generation, second harmonic generation, sum frequency generation, difference frequency generation, optical parametric generation and amplification and other three- or four-wave mixing processes. Cascaded processes, which occur simultaneously or in succession are also possible.

To achieve significant levels of frequency conversion the interacting waves have to remain in phase. Therefore, a phase-matching strategy has to be implemented in most of these devices. There are several phase-matching strategies. The most popular ones include type II phase matching using birefringence of the nonlinear optical material to prevent phase slip and quasi-phase-matching using a periodic variation in the nonlinear coefficient d to adjust for phase slip. Periodic variation of the nonlinear coefficient d is implemented, e.g., by a quasi-phase-matching (QPM) grating in which the value of the nonlinear coefficient d is reversed after 180° phase slip between the interacting waves.

In many nonlinear devices the interacting light waves are difficult to separate, or even distinguish, in space at the device output. In many cases this is because the interacting light waves propagate along the same optical path. This problem can be solved in some of these cases by using interacting waves with orthogonal polarizations in a type II phase-matching arrangement. However, this approach generally precludes the use of the largest nonlinear coefficient d. In addition, this approach is incompatible with some well-developed nonlinear material systems that integrate waveguides into the nonlinear material to better guide the interacting waves and increase conversion efficiency. Specifically, this approach cannot be used in proton-exchanged waveguides in lithium niobate ($LiNbO_3$), which guide a single polarization of light.

In some cases wavelength selective filters can be used to separate the interacting waves. Unfortunately, this approach is cumbersome and inefficient in many cases. Furthermore, if one of the frequencies of the output light is the same as one of the input light frequencies, then this approach cannot be used. In nonlinear frequency mixing devices using waveguides with quasi-phase-matched (QPM) gratings, interferometer structures can separate mixed output from pump light and signal input light. The use of such interferometers renders wavelength selective filters unnecessary. Such devices are called optical-frequency balanced mixers and the reader is referred to Jonathan R. Kurz, et al., "Optical-frequency Balanced Mixer", Optics Letters, Vol. 26, No. 16, August 2001, pp. 1283–1285 for further information. Although these devices can achieve good separation, further improvements in isolation and more efficient integration with waveguiding structures are desired.

Many prior art nonlinear frequency mixing devices use periodically poled gratings or poled structures in waveguides. The method of periodically poling such devices and controlling their poling is described in the prior art, e.g., in U.S. Pat. Nos. 5,630,004; 6,393,172 and Reissue Pat. No. 37,809. In addition, a method for controllable optical power splitting is addressed, e.g., in U.S. Pat. No. 5,488,681. These methods utilize poled structures (including asymmetric poled structures combined with waveguides) and applied electric fields. However, these references do not address nonlinear optical frequency mixing interactions between purely optical fields, and do not solve the problems of distinguishability and spatial separation in these cases.

The dependence of the propagation of the interacting waves on the characteristics of the waveguide has been recognized. For example, U.S. Pat. Nos. 5,872,884 and 5,991,490 teach an optical waveguide conversion device in which the refractive index and a thickness of the cladding layer are determined so as to satisfy a guiding condition for the light beam having a wavelength $\lambda_2$ and a cutoff condition for a light beam having a wavelength $\lambda_1$. While these designs teach that waveguides can be optimized for nonlinear mixing by tailoring the mode profiles, they do not address interactions between higher order modes and do not provide for easily separating and/or distinguishing them.

Additional teaching on variations in the core and cladding regions to alter the propagation properties of the interacting waves are discussed in U.S. Pat. No. 4,763,019 and the relationship of the propagation characteristics on temperature is further discussed in U.S. Pat. No. 5,546,220. Again, these references teach ways of manipulating the waveguide structure or temperature to facilitate nonlinear mixing between various modes, but do not address the problems of efficient nonlinear mixing between arbitrary odd, even, or asymmetric waveguide modes and their spatial separation.

In fact, engineering of the depth dependence of the nonlinear coefficient d has improved mode overlap efficiency in thin-film waveguides using higher-order modes. For some information on engineering the depth dependence the reader is referred to H. Ito, and H. Inaba, "Efficient Phase-Matched Second-Harmonic Generation Method in Four-Layered Optical-Waveguide Structure," Optics Letters, 2, pp. 139–141 (1978). Engineering of the depth dependence of nonlinear coefficient d has also improved mode overlap efficiency in QPM channel waveguides with non-uniform domain inversion, as documented by M. L. Bortz, S. J. Field, M. M. Fejer, D. Nam, R. Waarts, and D. Welch, "Noncritical Quasi-Phase-Matched Second Harmonic Generation in an Annealed Proton-Exchanged $LiNbO_3$ Waveguide," IEEE Journal of Quantum Electronics, 30, Dec. 1994, pp. 2953–2960. It should also be noted, that in the early development of guided nonlinear optics, the phase-matching requirement often led to the use of higher-order mode interactions as discussed, e.g., by G. I. Stegeman and C. T. Seaton, "Nonlinear integrated optics," Journal of Applied Physics, December 1985, Vol. 58, pp. R57–R77.

Unfortunately, none of the above apparatus or methods provide for simple, efficient, and robust spatial separation of the interacting waves in a nonlinear frequency mixer using QPM. What is needed is a simple and robust method of spatially separating the interacting waves that permits frequency mixing between multiple waves at the same or nearly the same wavelength. In addition, the method should allow for spectral inversion without wavelength offset and allow for simultaneous bi-directional wavelength conversion (so-called wavelength swapping).

OBJECTS AND ADVANTAGES

In view of the shortcomings of the prior art, it is a primary object of the present invention to provide an alternative approach to separate the various interacting waves in nonlinear frequency mixers employing quasi-phase-matching (QPM) gratings. The new approach is to provide for simple and efficient spatial separation between higher order waveguide modes including odd and even transverse width modes of the interacting waves.

It is another object of the invention to ensure that the higher order modes of the interacting waves, e.g., odd and even modes, can be easily separated using easy to fabricate integrated optical components such as directional couplers and asymmetric Y-junctions.

Still another object of the invention is to ensure that the method can be implemented in commonly available nonlinear frequency mixing arrangements including those using standard nonlinear optical materials and QPM gratings in proton-exchanged and annealed waveguides.

These and numerous other advantages of the present invention will become apparent upon reading the following description.

SUMMARY

An aspect of the invention is embodied by an apparatus for nonlinear frequency mixing of a light or light waves. The apparatus is made of a nonlinear material having a nonlinear coefficient d and a waveguide fabricated in the nonlinear material. The waveguide has a certain length and a certain transverse section. Furthermore, the apparatus has a quasi-phase-matching (QPM) grating extending along the length of the waveguide. The QPM grating is made such that it has a transverse asymmetry of the nonlinear coefficient d along the transverse section. In particular, the transverse asymmetry is chosen to establish a mode overlap for nonlinear frequency mixing between different transverse width modes of light. In the preferred embodiment the transverse section has a certain width and the transverse asymmetry establishes the mode overlap for nonlinear frequency mixing of the light between different transverse width modes.

Depending on the embodiment, the transverse asymmetry can be odd so as to establish mode overlap for frequency mixing between even transverse width modes and odd transverse width modes. The QPM grating can have single or multiple grating stripes. Alternatively, the QPM grating can be a staggered QPM grating whose grating stripes are interleaved. For example, the interleaved grating stripes can have a π-phase shift with respect to the waveguide.

In another embodiment, the transverse asymmetry is neither even nor odd, thus establishing a mode overlap for frequency mixing between even transverse width modes and odd transverse width modes. In one particular embodiment such even and odd transverse asymmetry is achieved with an angled QPM grating made up of inclined grating stripes.

More specifically, such angled QPM grating is described by an inclination angle Θ with respect to the waveguide. The inclination angle Θ is selected to produce a predetermined phase φ, depending on the application. The phase φ is a function of angle Θ as described by the following equation:

$$\phi = 2\pi x \frac{\tan\Theta}{\Lambda_g},$$

where x is the width and $\Lambda_g$ is a period of the QPM grating.

The apparatus of the invention can be fabricated in many types of nonlinear materials including crystals. Notably, it is convenient to implement the apparatus in a material selected from among $LiNbO_3$, $LiTaO_3$, KTP, RTA, KTA, RTP and ferroelectric crystals. Furthermore, it is convenient when the waveguide is of a type selected from among: annealed proton exchanged waveguides, titanium in-diffused waveguides or zinc-doped waveguides. It is also convenient to provide the apparatus for a device or arrangement for mode separation such that the different transverse width modes can be separated after undergoing the nonlinear mixing. In one embodiment the device for mode separation is a directional coupler. In another embodiment the device for mode separation is an asymmetric y-junction.

In alternative embodiments the device of the invention can also be made from other alternative materials exhibiting the appropriate nonlinear susceptibility χ. Such materials can be selected from among crystalline materials, polycrystalline materials, ceramics, glasses, amorphous materials, liquids, gases, gels, semiconductors and insulators.

The invention also extends to a method for nonlinear frequency mixing of a light or light waves in the nonlinear material exhibiting the nonlinear coefficient d. The method involves the steps of producing the waveguide of predetermined length and transverse section in the nonlinear material. In another step, the method involves selection of an appropriate transverse asymmetry in the nonlinear coefficient d in the transverse section and producing the QPM grating along the length of the waveguide such that the QPM grating exhibits the chosen transverse asymmetry. To perform the nonlinear frequency mixing the light is in-coupled into the waveguide such that quasi-phase-matched nonlinear frequency mixing occurs between different modes of light. The transverse asymmetry can be odd transverse symmetry or an asymmetry that is neither odd nor even.

The types of nonlinear frequency mixing operations that are performed by the apparatus include harmonic and sub-harmonic generation, second harmonic generation (SHG), sum frequency generation, difference frequency generation (DFG), optical parametric generation, optical parametric amplification and optical parametric oscillation. These operations are performed either singly or in a cascaded arrangement. For example, the nonlinear frequency mixing involves at least two nonlinear frequency mixing processes occurring simultaneously in the same QPM grating. Alternatively, the nonlinear frequency mixing involves at least two nonlinear frequency mixing processes occurring in succession, e.g., in two separate QPM gratings positioned one after the other.

In a preferred embodiment of the method the different modes, more precisely the various odd and even transverse width modes emerging from the nonlinear frequency mixing process or processes are separated. Further details of the apparatus and method of the invention are presented in the detailed description and the preferred and alternative embodiments with reference to the attached drawing figures.

DETAILED DESCRIPTION

Figure 1:
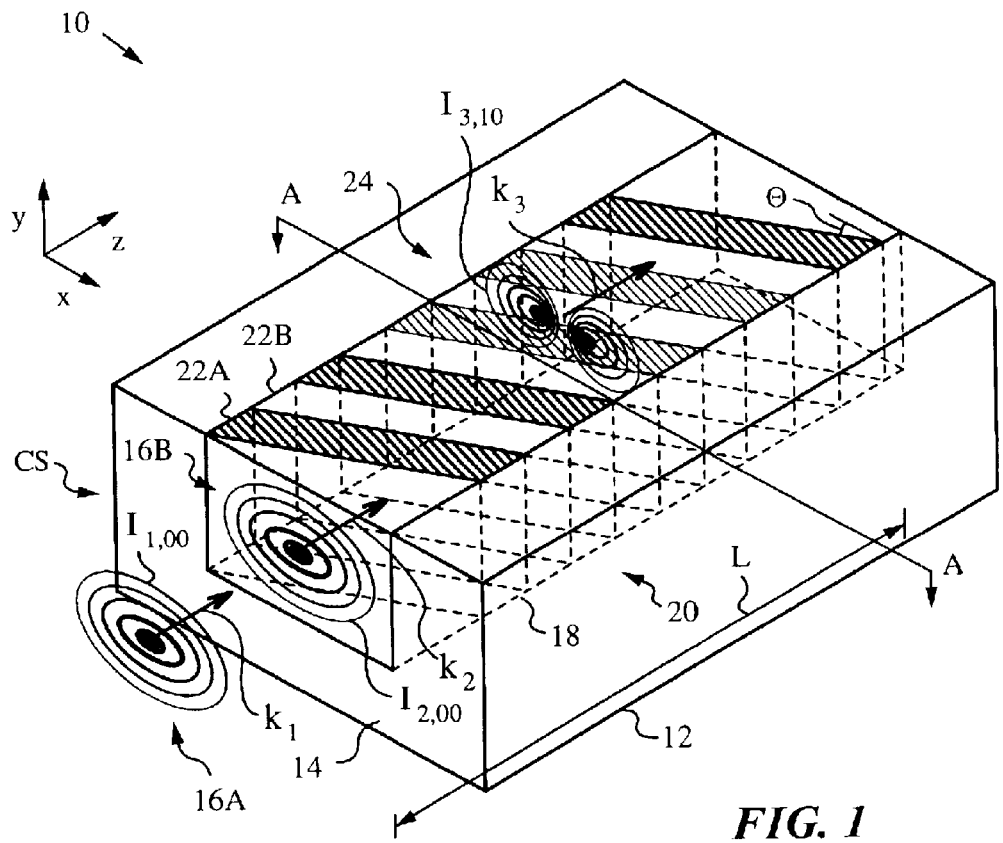
FIG. 1 is a three dimensional diagram illustrating an apparatus for nonlinear frequency mixing of odd and even modes of light in accordance with the invention.

The instant invention will be best understood by first referring to an apparatus 10 for nonlinear frequency mixing interacting light waves in accordance with the invention as illustrated in FIG. 1. Apparatus 10 is made of a nonlinear optical material 12 such as $LiNbO_3$ or $LiTaO_3$. In fact, material 12 can be any type of material exhibiting the appropriate nonlinear susceptibility $\chi$ to support a desired nonlinear frequency mixing operation. For example, the nonlinear susceptibility $\chi$ can be a second order susceptibility $\chi^{(2)}$ for mediating a three-wave interaction or even a higher order susceptibility for mediating other nonlinear interactions. These interactions are supported when using KTP, RTA, KTA, RTP or a ferroelectric crystal as material 12. In the most general case, material 12 can be a crystalline material, a polycrystalline material, a ceramic, a glass, an amorphous material, a liquid, a gas, a gel, a semiconductor or an insulator.

The nonlinear nature of material 12 will be denoted either by its nonlinear susceptibility $\chi$ or by its nonlinear coefficient d. In the present embodiment material 12 is $LiNbO_3$ and it is oriented lengthwise along the z-direction, as indicated by the coordinate axes. An input facet 14 of apparatus 10 is oriented in the x-y plane for accepting input light in the form of a first wave 16A and a second wave 16B both propagating along the z-direction.

Apparatus 10 has a waveguide 18 fabricated in material 12 extending along the z-direction. Waveguide 18 has a length L and a cross-section CS defined in the x-y plane. It is one of the roles of waveguide 18 to accept waves 16A, 16B at input facet 14 and to confine their propagation such that they interact efficiently within waveguide 18 via the second order susceptibility $\chi^{(2)}$ of material 12. In the preferred embodiment waveguide 18 is an annealed proton exchanged waveguide. In alternative embodiments waveguide 18 can also be a titanium in-diffused waveguide or a zinc-doped waveguide. A person skilled in the art will recognize that there are many methods for producing waveguide 18 and that these will generally differ based on material 12 selected for apparatus 10.

In order to quasi-phase-match the nonlinear frequency interaction between waves 16A and 16B in accordance with well-known QPM techniques apparatus 10 is equipped with a quasi-phase-matching (QPM) grating 20 extending along the length L of waveguide 18. Grating 20 is composed of a succession of interposed grating stripes 22A and 22B. Grating stripes 22A, 22B differ in the patterning of the sign of nonlinear coefficient d. In fact, the sign of nonlinear coefficient d is reversed between stripes 22B and 22A.

In accordance with the invention, QPM grating 20 exhibits a certain transverse asymmetry along the transverse section (in the x-y plane). In particular, QPM grating 20 exhibits an asymmetry of nonlinear coefficient d along the x-direction, i.e., a variation of d(x). This modification of QPM grating 20 alters the symmetry of d(x) and enables efficient nonlinear mixing between different transverse width modes of light or light waves.

The effect of mixing of waves with different transverse width modes in all QPM gratings according to the invention takes advantage of a proportionality that exists between nonlinear mixing efficiency $\eta$ and the spatial overlap of $\bar{d}$ and the normalized electric fields or mode fields $E_{jk}$. Here $\bar{d}$ represents the phase-matched Fourier component of grating 20 that is a periodic modulation of nonlinear coefficient d along the z-direction). This proportionality is conveniently expressed as:

$$\eta \propto \left| \int_{-\infty}^{\infty} \int \bar{d}(x,y) E_{1,jk}(x,y) E_{2,lm}(x,y) E_{3,np}^*(x,y) dx dy \right|^2 \quad \text{Eq. 1}$$

where (x,y) are transverse to propagation direction z. The first subscript of each interacting field E identifies the frequency (where $\omega_3 = \omega_1 + \omega_2$) while the two lettered subscripts represent the width and depth mode numbers. The quasi-phase-matching condition satisfied by QPM grating 20 is determined by the wave vectors or k-vectors of the interacting waves 16A, 16B and a generated polarization wave 24, namely $k_1$, $k_2$ and $k_3$ as follows:

$$k_3 - k_2 - k_1 - k_g = 0, \quad \text{Eq. 2}$$

where the k-vectors are set by the effective indices of the interacting field modes (e.g., for wave 16A propagating at a wavelength $\lambda_1$ k-vector $k_1$ is equal to $2\pi n_{eff,1}/\lambda_1$) and the grating k-vector $k_g$ is equal to $2\pi/\Lambda_g$, where $\Lambda_g$ is the grating period.

In the embodiment of FIG. 1 the asymmetry of nonlinear coefficient d along the x direction is ensured because QPM grating 20 is an angled grating composed of inclined grating stripes 22A, 22B. The inclination of grating stripes 22A, 22B is defined by an inclination angle $\Theta$ with respect to waveguide 18. More precisely, inclination angle $\Theta$ is defined with respect to the x-axis. This type of inclined grating 20 has an asymmetry in d(x) that is neither even nor odd. Therefore, both even and odd transverse width modes of light or light waves 16A, 16B and of polarization 24 created by light waves 16A, 16B are phase-matched by QPM grating 20. More precisely, angled QPM grating 20 tilted with respect to waveguide 18 acts to endow d with an x-dependent phase:

$$\phi = 2\pi x \frac{\tan\Theta}{\Lambda_g} \qquad \text{Eq. 3}$$

where $\Theta$ is the inclination angle and $\Lambda_g$ is the period of QPM grating 20.

Although grating 20 can be used to perform various three-wave mixing processes in which the $\omega_3=\omega_1+\omega_2$ energy conservation condition and the quasi-phase-matching condition of equation 2 are met, the explanation of the operation of apparatus 10 will be based on the nonlinear frequency mixing process of second harmonic generation (SHG) for reasons of clarity. In this case the frequencies $\omega_1$, $\omega_2$ of input waves 16A, 16B are equal ($\omega_1=\omega_2$) and are referred to as First Harmonic (FH). Generated wave 24 is a Second Harmonic (SH) wave at a frequency ($\omega_3=2\omega_1$). Also, both input waves 16A, 16B are in the fundamental mode (00-mode, also referred to as $TM_{00}$).

To better visualize the SHG process the intensity distributions $I_{1,00}$ and $I_{2,00}$ of interacting waves 16A, 16B in the fundamental mode are illustrated in FIG. 1. Of course in the particular case of SHG, $I_{1,00}$ and $I_{2,00}$ are identical. Second Harmonic wave 24 at $\omega_3=2\omega_1$ is generated by waves 16A, 16B in accordance with equation 2 corresponding to the quasi-phase-matching condition satisfied by grating 20. Because of the asymmetry of grating 20, the Second Harmonic wave 24 is in the first higher-order transverse width mode (10 mode or $TM_{10}$). The intensity distribution $I_{3,10}$ corresponding to Second Harmonic wave 24 in the first higher-order mode is illustrated in FIG. 1. It should be noted that the first higher-order mode is odd while the fundamental mode is even.

Figure 2A:
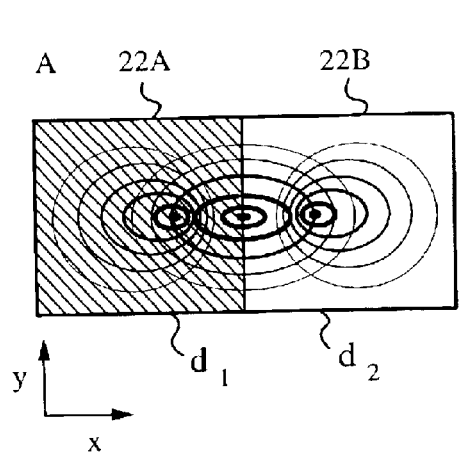
FIG. 2A is a cross sectional view along line A—A of the waveguide of the apparatus shown in FIG. 1.
Figure 2B:
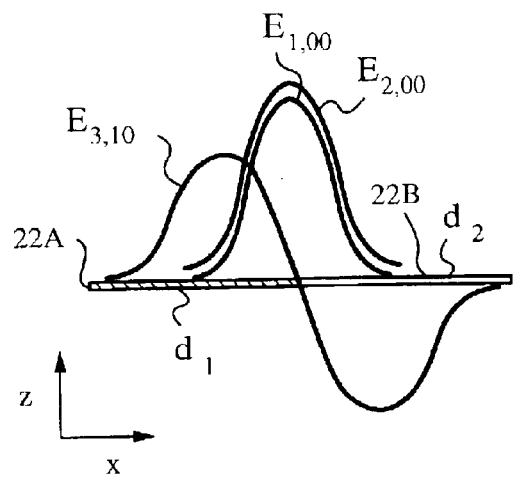
FIG. 2B is a diagram illustrating the electric field distributions for odd and even modes of light undergoing nonlinear frequency mixing within the waveguide of the apparatus of FIG. 1.

FIG. 2A is a cross-sectional view along line A—A through waveguide 18 illustrating the overlap between the intensity distributions of waves 16A, 16B and Second Harmonic wave 24 in the higher-order mode. The different values of the nonlinear coefficient d in grating stripes 22A and 22B are labeled $d_1$ and $d_2$. FIG. 2B shows a top view of a thin slice of waveguide 18 and the corresponding electric fields or mode fields $E_{jk}$.

Prior art QPM grating fabrication techniques, such as electric field poling of ferroelectric materials, often yield gratings in which the nonlinear coefficient d(x,y) is constant over the extent of the waveguide. With these standard gratings, it is not possible to generate Second Harmonic waves in odd modes such as Second Harmonic wave 24 from input waves in even modes, e.g., fundamental modes, as in the case of waves 16A, 16B. That is because of the symmetry of the coupling coefficient $\eta$ as expressed in equation 1. More specifically, two even modes mixing with an odd mode under an even nonlinear coefficient d have a null efficiency overlap integral ($\eta=0$). In order to use all odd and even mode combinations generally in nonlinear mixing processes, one cannot use gratings that have only even symmetry. For standard channel waveguides—and all waveguides with symmetric and antisymmetric width modes—quasi-phase-matched SHG with standard, even gratings cannot produce $E_{3,10}$ from $E_{1,00}$. The same goes for all nonlinear mixing interactions that use a mixture of higher order modes whose overall symmetry is odd. To achieve such mixing the symmetry has to be broken by producing an asymmetry in the grating as taught by the present invention.

QPM grating 20 in fact has an asymmetry that is neither even nor odd. This asymmetry establishes the mode overlap for frequency mixing between even transverse width modes and odd transverse width modes. It should be noted that the modes do not have to involve the fundamental mode and can instead involve second- third- and higher order modes. Furthermore, the types of asymmetries which can be used in accordance with the invention extend to any variation of nonlinear coefficient d(x) along the width of the waveguide that breaks the even symmetry and promotes mixing of odd and even transverse width modes of any order.

Figure 3:
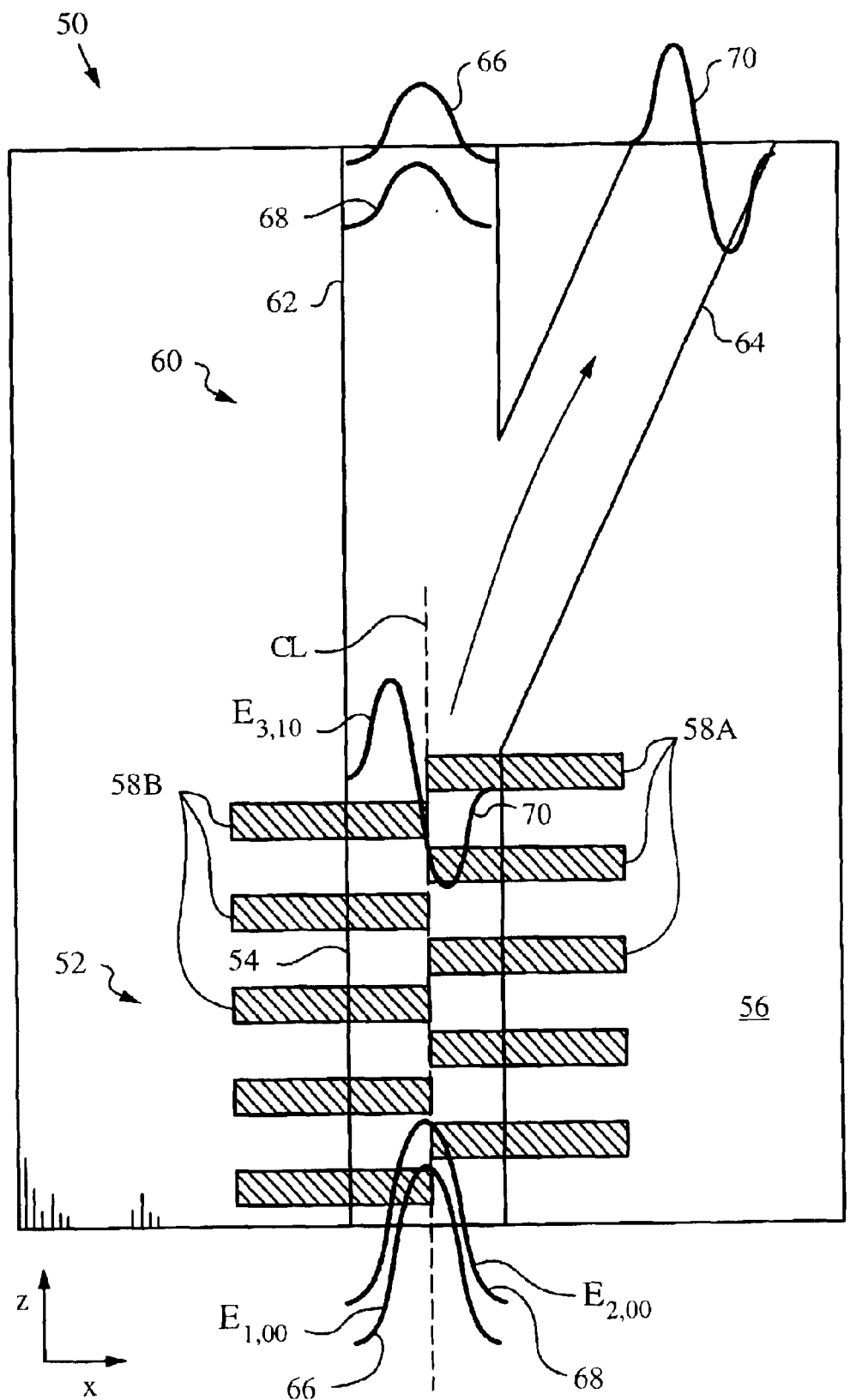
FIG. 3 is a top plan view of another apparatus of the invention employing an odd symmetry QPM grating composed of interleaved grating stripes and employing a y-junction for mode separation.

In particular, a QPM grating 52 with an odd transverse asymmetry or a completely antisymmetric variation of nonlinear coefficient d(x) can be employed as illustrated in a top plan view of an apparatus 50 in FIG. 3. Apparatus 50 has a waveguide 54 fabricated in nonlinear material 56. Waveguide 54 extends along a center line CL and a number of grating stripes 58A, 58B are staggered on both sides of waveguide 54 with respect to center line CL. Grating stripes 58A, 58B are interleaved, thus rendering grating 52 a staggered and interleaved grating. In general the degree of interleaving can vary. In the present embodiment the interleaving is not complete.

The difference in the sign of the nonlinear coefficient d in waveguide 54 and stripes 58A, 58B is chosen to produce a $\pi$-phase shift with respect to waveguide 54 at its center. This transverse asymmetry established in waveguide 54 by QPM grating 52 promotes mode overlap between even and odd transverse width modes in accordance with equation 1. In particular, QPM grating 52 is well suited to support frequency mixing between even and odd modes involving the two lobed first order transverse width mode ($TM_{10}$). It should be noted that different types and degrees of interleaving can be used to better suit QPM grating 52 to handle other higher order transverse width modes.

Apparatus 50 is also equipped with an arrangement for mode separation 60. Arrangement 60 is an asymmetric y-junction in this embodiment. However, a directional coupler or any other type of optical mode-selective coupling/splitting device can be used as arrangement 60. Y-junction 60 has two arms 62, 64. The coupling of light between arms 62, 64 at their junction is designed to separate odd and even transverse width modes.

The operation of apparatus 50 is best understood on the basis of second harmonic generation (SHG). Two input light waves 66, 68 indicated here by their corresponding field modes $E_{1,00}$ and $E_{2,00}$ are admitted into waveguide 54. The frequencies of input light waves 66, 68 are equal ($\omega_1=\omega_2$) and they add to produce a second harmonic output light wave 70 at a frequency $\omega_3$ ($\omega_3=2\omega_1$). In this figure output wave 70 is indicated by its odd transverse field mode $E_{3,10}$.

Input waves 66, 68 and Second Harmonic wave 70 interact and propagate along the z-direction through waveguide 54 in the direction of asymmetric y-junction 60. At y-junction 60 all field modes corresponding to the fundamental transverse width mode ($TM_{00}$), $E_{1,00}$ and $E_{2,00}$ continue propagating straight into arm 62. These field modes correspond to input waves 66, 68. Meanwhile, field modes corresponding to odd transverse field modes, such the first-order transverse width mode ($TM_{10}$) (or field mode $E_{3,10}$) of Second Harmonic wave 70 couple into arm 64.

In this manner apparatus 50 achieves spatial separation between input waves 66, 68 and output wave 70. It should be noted that unlike in the prior art, the ability to separate these waves is based on mode separation and not frequency separation. Therefore, the method of invention can be used even if the waves to be separated have the same frequency. In fact, the use of higher order modes combined with integrated optics structures for mode separation such as asymmetric y-junctions or directional coupler provides for efficient isolation and spatial separation of waves, as compared to prior art structures including interferometric structures. In addition to being efficient, such apparatus is compatible with implementation in periodically poled lithium niobate and proton diffused and annealed waveguides. This is important because annealed proton exchanges waveguides in periodically poled lithium niobate (PPLN) are among the most efficient nonlinear mixing devices available and are preferred for odd-mode QPM in accordance with the invention. The fabrication tolerances of such systems are better than those of interferometric systems. For more information on directional couplers and asymmetric y-junctions the reader is referred to Nishihara, H., Haruna, M., Suhara, T., Optical Integrated Circuits, 2nd ed., Ohmsha Ltd., Tokyo, 1993.; H. Yajima, "Dielectric Thin Film Optical Branching Waveguide," Applied Physics Letters, 22, 1973, pp. 647–649; W. K. Burns and A. Fenner Milton, "Mode Conversion in Planar-Dielectric Separating Waveguides," Journal of Quantum Electronics, QE-11, 1975, pp. 32–39 and Y. Silberberg, P. Perlmutter, and J. E. Baran, "Digital Optical Switch," Applied Physics Letters, 51, 1987, pp. 1230–1232.

Figure 4:
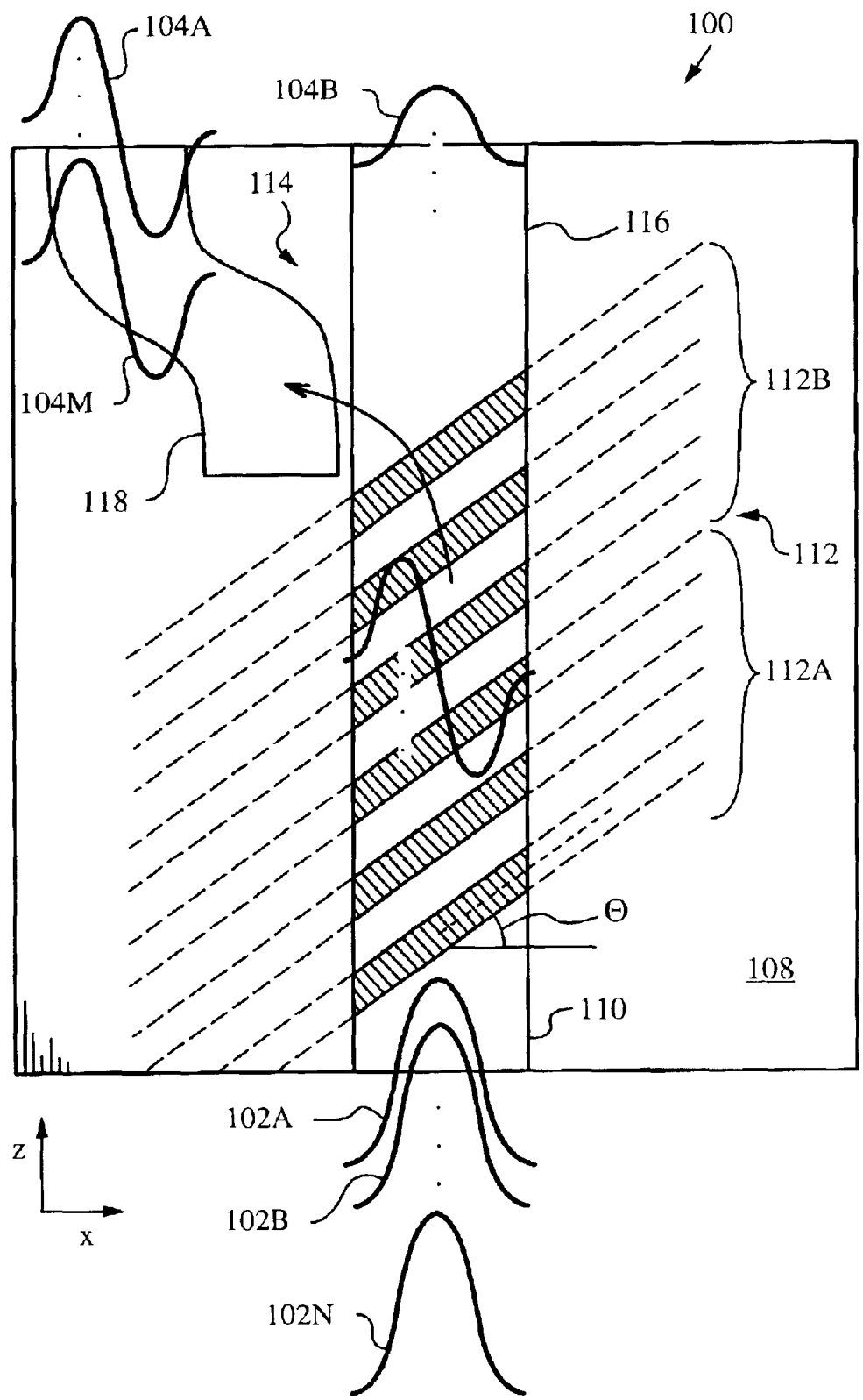
FIG. 4 is a top plan view of still another apparatus according to the invention employing and angled QPM grating having an odd and even symmetry and a directional coupler for mode separation.

FIG. 4 illustrates another apparatus 100 according to the invention for nonlinear frequency mixing between input waves 102A, 102B . . . 102N and output waves 104A, 104B, . . . 104M. Apparatus 100 is made of a nonlinear material 108. A waveguide 110 with an inclined QPM grating 112 that introduces a transverse asymmetry to the nonlinear coefficient d is provided in waveguide 110.

A directional coupler 114 having a first arm 116 and a second arm 118 is fabricated in material 108. Coupler 114 is designed to couple odd modal fields into second arm 118 and to pass even modal fields along first arm 116. This selective coupling works by exploiting the difference in coupling strengths between the first and second field modes. The second mode couples more strongly to the field mode 104M because of its larger extent and better overlap with the exponential tail of this mode.

Apparatus 100 can support any nonlinear frequency mixing process quasi-phase-matched by QPM grating 112. In particular, processes such as harmonic and sub-harmonic generation, second harmonic generation, sum frequency generation, difference frequency generation, optical parametric generation, optical parametric amplification and optical parametric oscillation are supported by apparatus 100. These processes can be cascaded such that at least two nonlinear frequency mixing processes occur in succession, e.g., in successive sections of QPM grating 112 indicated by references 112A, 112B. Alternatively, the cascaded processes can occur simultaneously throughout QPM grating 112.

While altering the symmetry of d can assure nonzero efficiency for odd-mode QPM, this efficiency is still proportional to the mode overlap as expressed in equation 1. Thus, in general, using higher order modes rather than the fundamental modes in symmetric waveguides as taught by the prior art degrades mode overlap because of the additional minima in the modal fields. The below examples illustrate some practical implementations of the apparatus and method of invention and some associated performance characteristics.

EXAMPLES

Figure 5:
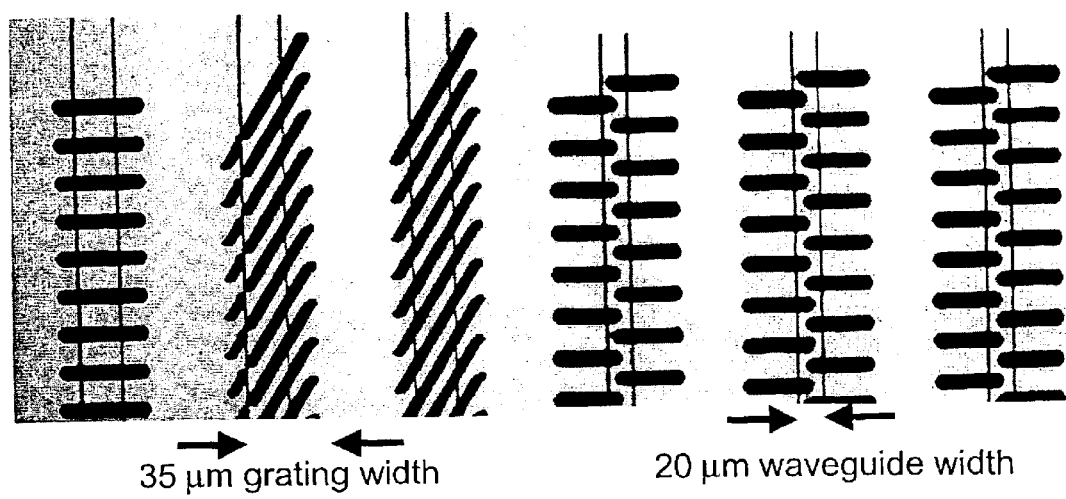
FIG. 5 shows standard prior art gratings in comparison with angled, and staggered gratings precisely aligned to waveguides according to the invention.

An angled grating with an angle of inclination Θ=60° in accordance with the invention was produced in periodically poled lithium niobate (PPLN). The grating stripes exhibited hexagonal domain structure of congruent lithium niobate and had narrow (as measured perpendicular to the k vector) grating stripes. A staggered grating was fabricated by accounting for the domain spreading along the x direction during poling. FIG. 5 shows standard, angled, and staggered gratings precisely aligned to waveguides and etched for visibility; the etching enlarges and rounds the edges of the inverted domains slightly. These devices had QPM periods between 14.75 μm and 16.75 μm, waveguide widths ranging from 8–20 μm and an initial proton exchange depth of 0.8 μm.

Figure 6:
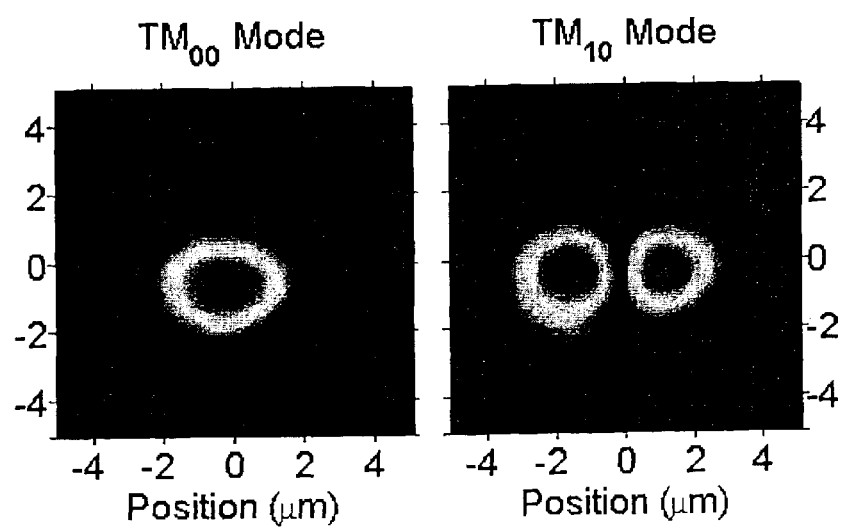
FIG. 6 shows CCD images of both fundamental and first order transverse width modes in 8 $\mu$m waveguides with different QPM periods.

SHG measurements using the $TM_{00}$ mode of the FH tuned between 1540 and 1565 nm demonstrated efficient generation of both the $TM_{00}$ and $TM_{10}$ SH modes. CCD images of both modes in 8 μm waveguides (with different QPM periods) are shown in FIG. 6. In the shading scheme used, the highest and lowest intensity points appear black. Normalized conversion efficiencies as high as 400%/W and 220%/W for the $TM_{00}$ and $TM_{10}$ modes, respectively, were measured in devices with 4 cm long angled gratings. With standard gratings only the $TM_{00}$ mode could be phase matched, providing 900%/W efficiency as expected.

Figure 7:
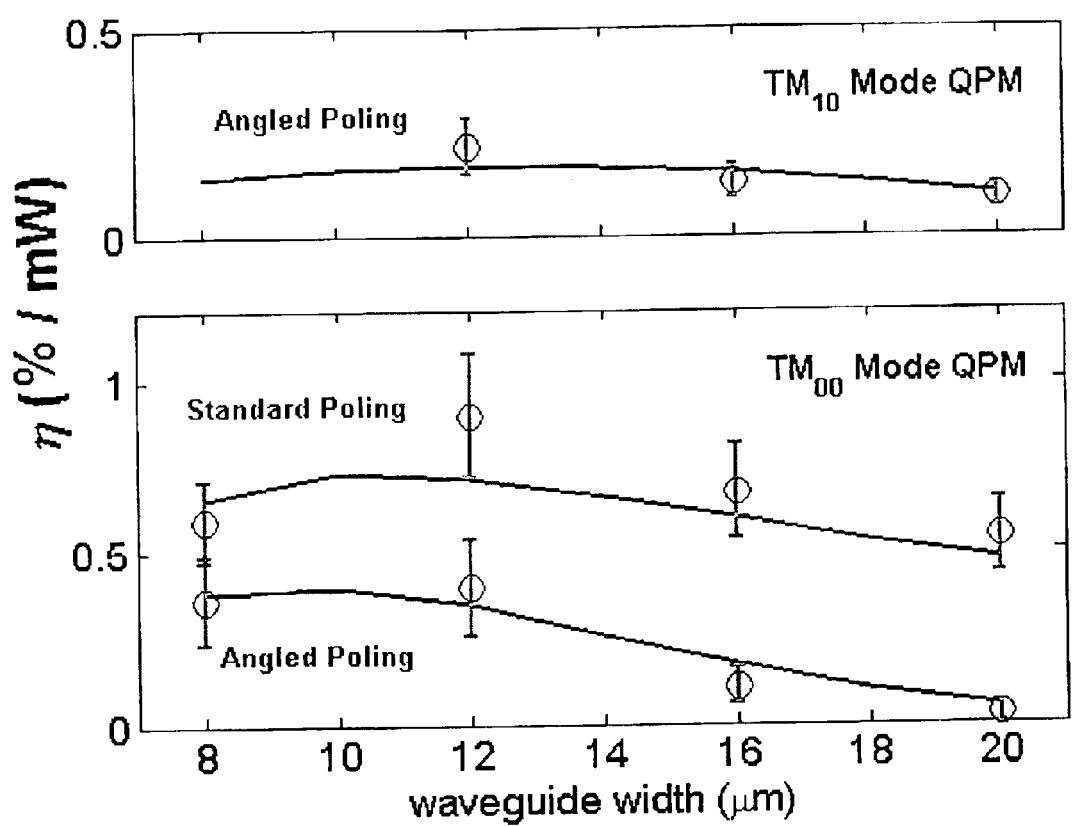
FIG. 7 are graphs of measurements (represented by open circles) of the SHG efficiency of both transverse width modes using 60° angled and standard gratings for a wide range of waveguide widths.

FIG. 7 compiles measurements (represented by open circles) of the SHG efficiency of both modes using 60° angled and standard gratings for a wide range of waveguide widths. The solid lines are efficiency calculations based on modal fields obtained with our waveguide fabrication model. As shown, this model successfully predicts the relative SHG efficiencies for both modes for all the waveguide widths tested.

Apparatus with staggered QPM gratings have far more stringent tolerances between the periodic poling and waveguides, and they showed approximately half the expected $TM_{10}$ mode SHG efficiency. Mode overlap calculations indicate that this reduction is consistent with a misalignment in x (assuming perfect angular alignment) of ≈1 mm. Therefore, a person skilled in the art should pay special attention to alignment in employing these types of gratings and should resort to a vernier-like system of deliberate misalignments to compensate for fabrication errors as necessary. Non-zero generation of the $TM_{00}$ SH mode also indicates that some poling-waveguide misalignment exists, since staggered QPM gratings should only produce odd modes. A person skilled in the art should resort to any alignment verification and compensation techniques to avoid this condition.

Figure 8:
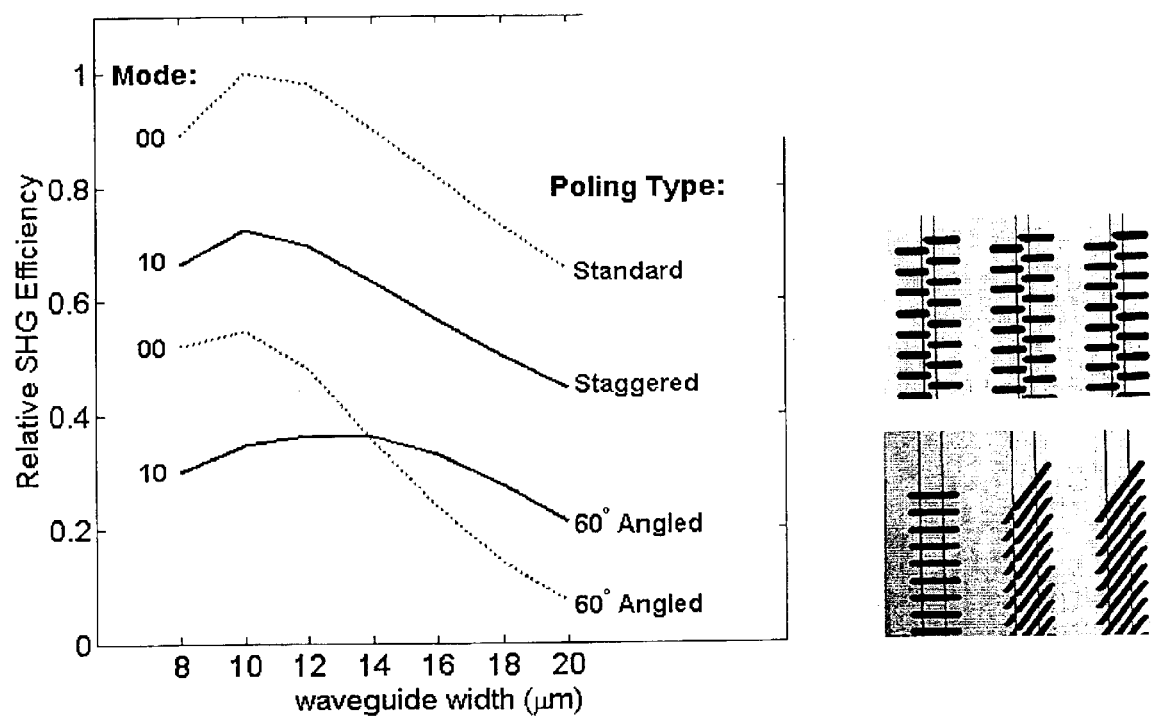
FIG. 8 are graphs comparing calculated SHG efficiencies for three types of poling used in fabricating the waveguides with QPM gratings.

FIG. 8 compares calculated SHG efficiencies for all three poling types, for the range of waveguides fabricated. An ideal staggered poling device has roughly twice the $TM_{10}$ mode SHG efficiency of an angled grating with an inclination angle Θ of 60°, and about 70% of the $TM_{00}$ mode SHG efficiency of a standard poling device.

Angled and staggered gratings permit QPM interactions between odd and even modes of waveguides symmetric in x. PPLN waveguide modes are not symmetric in y, however, since asymmetric depth profiles for the refractive index and the nonlinear coefficient d(y) result from the annealed proton exchange process. Consequently, SHG of $TM_{01}$ modes (first order depth mode) is possible with a $TM_{00}$ mode FH input light. In a similar fashion, modified gratings can complement PPLN waveguides with x-asymmetry for efficient QPM of asymmetric modes.

A person skilled in the art will recognize that the apparatus and method of invention admit of numerous alternative embodiments. For example, it is possible to use single or multiple grating stripes in QPM gratings according to the invention. By exercising control over periodic poling, one can fabricate narrow stripes of QPM grating that have width features that are comparable, or even smaller in size than the width of the waveguide. Furthermore, instead of creating an asymmetric waveguide by interleaving two stripes of QPM grating, it is also possible to use a single (off-center) stripe to achieve the symmetry-breaking needed for nonlinear mixing between odd and even waveguide modes. In fact, one can create several staggered stripes of QPM grating to match the positive and negative lobes of a particular waveguide mode, in order to maximize the net efficiency overlap integral of equation 1.

A person skilled in the art should also note that when using liquids, gases, or gels as the nonlinear optical material these materials are contained in microscopic cells small enough to support waveguiding. The QPM grating properties are built into the arrangement of these cells, which are required to have a modulation in their nonlinear optical susceptibility, $\chi$.

The person skilled in the art should also adjust for QPM grating fabrication techniques, such as electric field poling of ferroelectrics, that tend to yield structures in which d(x,y) is constant over the extent of the waveguide. Since gratings are often formed in ferroelectric materials by inverting domains through periodic poling, and the inverted domains usually propagate completely through the ferroelectric material, most QPM gratings have no variation in the depth (y) direction. Furthermore, most gratings are designed to be uniform in the width (x) direction because this increases efficiency for standard interactions between bulk beams or fundamental waveguide modes. In general, during the periodic poling process domains prefer to grow aligned with crystalline axes, without changing direction. This fact makes it simpler to create uniform gratings instead of gratings with small-scale transverse patterning as desired for the present apparatus and method. It should also be kept in mind that width modes with and depth modes can be combined by altering the symmetry of the nonlinear coefficient along the y-direction, d(y), in addition to the asymmetric distribution of the nonlinear coefficient along the x-direction, d(x), as taught herein.

It will be clear to one skilled in the art that the above embodiments may be altered in many ways without departing from the scope of the invention. Accordingly, the scope of the invention should be determined by the following claims and their legal equivalents.

What is claimed is:

1. An apparatus for nonlinear frequency mixing of a light, said apparatus comprising:
   a) a nonlinear material having a nonlinear coefficient d;
   b) a waveguide in said nonlinear material, said waveguide having a length and a transverse section;
   c) a quasi-phase-matching grating extending along said length of said waveguide, said quasi-phase-matching grating having a transverse asymmetry of said nonlinear coefficient d in said transverse section;
   said transverse asymmetry establishing a mode overlap for nonlinear frequency mixing between different transverse width modes of said light.

2. The apparatus of claim 1, wherein said transverse section has a width, and said transverse asymmetry establishes said mode overlap for nonlinear frequency mixing of said light between different transverse width modes.

3. The apparatus of claim 1, wherein said transverse asymmetry is odd, thereby establishing said mode overlap for frequency mixing between even transverse width modes and odd transverse width modes.

4. The apparatus of claim 3, wherein said quasi-phase-matching grating comprises single or multiple grating stripes.

5. The apparatus of claim 3, wherein said quasi-phase-matching grating is a staggered quasi-phase-matching grating comprising interleaved grating stripes.

6. The apparatus of claim 5, wherein said interleaved grating stripes have a $\pi$-phase shift with respect to said waveguide.

7. The apparatus of claim 1, wherein said transverse asymmetry is neither even nor odd, thereby establishing said mode overlap for frequency mixing between even transverse width modes and odd transverse width modes.

8. The apparatus of claim 7, wherein said quasi-phase-matching grating is an angled quasi-phase-matching grating comprising inclined grating stripes.

9. The apparatus of claim 7, wherein said quasi-phase-matching grating is an angled quasi-phase-matching grating having an inclination angle $\Theta$ with respect to said waveguide.

10. The apparatus of claim 9, wherein said inclination angle $\Theta$ is selected to produce a predetermined phase $\phi$:

$$\phi = 2\pi x \frac{\tan\Theta}{\Lambda_g},$$

where x is said width and $\Lambda_g$ is a period of said quasi-phase-matching grating.

11. The apparatus of claim 1, wherein said nonlinear material is a material selected from the group consisting of $LiNbO_3$, $LiTaO_3$, KTP, RTA, KTA, RTP, and a ferroelectric crystal.

12. The apparatus of claim 1, comprising a material having a nonlinear optical susceptibility $\chi$ selected from the group consisting of crystalline materials, polycrystalline materials, ceramics, glasses, amorphous materials, liquids, gases, gels, semiconductors and insulators.

13. The apparatus of claim 1, wherein said waveguide is an annealed proton exchanged waveguide.

14. The apparatus of claim 1, further comprising a mode-separation means, for separating said different transverse width modes.

15. The apparatus of claim 14, wherein said mode-separation means comprises an element selected from the group consisting of a directional coupler and an asymmetric y-junction.

16. A method for nonlinear frequency mixing of a light in a nonlinear material having a nonlinear coefficient d, said method comprising:
   a) producing in said nonlinear material a waveguide having a length and a transverse section;
   b) selecting a transverse asymmetry of said nonlinear coefficient d in said transverse section;
   c) producing a quasi-phase-matching grating along said length of said waveguide, said quasi-phase-matching grating having said transverse asymmetry; and
   d) in-coupling a light into said waveguide, such that quasi-phase-matched nonlinear frequency mixing occurs between different modes of said light.

17. The method of claim 16, wherein said step of selecting said transverse asymmetry comprises selecting an odd transverse symmetry.

18. The method of claim 16, wherein said step of selecting said transverse asymmetry comprises selecting a neither even nor odd transverse symmetry.

19. The method of claim 16, wherein said phase-matched nonlinear frequency mixing is a mixing operation selected from the group consisting of harmonic and sub-harmonic generation, second harmonic generation, sum frequency generation, difference frequency generation, optical parametric generation, optical parametric amplification and optical parametric oscillation.

20. The method of claim 16, wherein said phase-matched nonlinear frequency mixing is a cascaded frequency mixing in which at least two nonlinear frequency mixing processes occur simultaneously.

21. The method of claim 16, wherein said phase-matched nonlinear frequency mixing is a cascaded frequency mixing in which at least two nonlinear frequency mixing processes occur in succession.

22. The method of claim 16, further comprising separating said different transverse width modes.

* * * * *